United States Patent
Ivanov et al.

(10) Patent No.: US 11,995,809 B2
(45) Date of Patent: May 28, 2024

(54) METHOD AND APPARATUS FOR COMBINING LOW-DYNAMIC RANGE IMAGES TO A SINGLE IMAGE

(71) Applicant: THUNDER SOFTWARE TECHNOLOGY CO., LTD., Beijing (CN)

(72) Inventors: Angel Dragomirov Ivanov, Sofia (BG); Stefan Parvanov Bonchev, Sofia (BG)

(73) Assignee: THUNDER SOFTWARE TECHNOLOGY CO., LTD., Beijing (CN)

( * ) Notice: Subject to any disclaimer, the term of this patent is extended or adjusted under 35 U.S.C. 154(b) by 374 days.

(21) Appl. No.: 17/549,730

(22) Filed: Dec. 13, 2021

(65) Prior Publication Data

US 2022/0101503 A1    Mar. 31, 2022

Related U.S. Application Data

(63) Continuation of application No. PCT/CN2019/082328, filed on Apr. 11, 2019.

(51) Int. Cl.

| G06K 9/00 | (2022.01) |
|---|---|
| G06T 5/40 | (2006.01) |
| G06T 5/92 | (2024.01) |
| H04N 23/73 | (2023.01) |
| H04N 23/741 | (2023.01) |

(52) U.S. Cl.
CPC .......... *G06T 5/92* (2024.01); *G06T 5/40* (2013.01); *H04N 23/73* (2023.01); *H04N 23/741* (2023.01)

(58) Field of Classification Search
CPC .............. G06T 5/40; G06T 2207/20221
See application file for complete search history.

(56) References Cited

U.S. PATENT DOCUMENTS

| 2003/0174886 | A1* | 9/2003 | Iguchi | .................. | H04N 1/6086 |
|---|---|---|---|---|---|
| | | | | | 382/167 |
| 2006/0177150 | A1 | 8/2006 | Uyttendaele et al. | | |
| 2007/0036405 | A1* | 2/2007 | Lienard | ..................... | G06T 5/50 |
| | | | | | 382/128 |
| 2008/0259007 | A1* | 10/2008 | Chiu | .................... | G09G 3/2011 |
| | | | | | 345/77 |

(Continued)

FOREIGN PATENT DOCUMENTS

| CN | 103778614 A | 5/2014 |
|---|---|---|
| CN | 104616273 A | 5/2015 |

(Continued)

OTHER PUBLICATIONS

International Search Report of PCT/CN2019/082328.
Written Opinion of PCT/CN2019/082328.

*Primary Examiner* — Hadi Akhavannik (57) ABSTRACT

The invention discloses a method to combine low-dynamic range images with different exposures to construct a high-dynamic range image. The method deals with the motions such that to minimize the chance of such "non-recoverable" occlusions and avoids the necessity of knowing or finding the response functions of the low-dynamic range images. Apart from that, the method is fast enough to be used in a mobile camera device and produce good user experience.

20 Claims, 3 Drawing Sheets

(56) References Cited

U.S. PATENT DOCUMENTS

| | | | | |
|---|---|---|---|---|
| 2009/0169102 A1* | 7/2009 | Zhang | ............... | G06T 5/70 |
| | | | | 382/167 |
| 2010/0183071 A1* | 7/2010 | Segall | ............... | H04N 19/33 |
| | | | | 382/167 |
| 2011/0176024 A1* | 7/2011 | Kwon | ............... | H04N 23/951 |
| | | | | 348/222.1 |
| 2011/0305405 A1* | 12/2011 | Kawamura | ............... | G06T 3/14 |
| | | | | 382/294 |
| 2012/0050474 A1* | 3/2012 | Segall | ............... | G06T 5/50 |
| | | | | 348/E13.001 |
| 2013/0070965 A1* | 3/2013 | Jang | ............... | G06T 5/90 |
| | | | | 382/103 |
| 2015/0170389 A1* | 6/2015 | Ming | ............... | G06T 5/50 |
| | | | | 382/284 |
| 2021/0118139 A1* | 4/2021 | Xu | ............... | G06T 5/77 |

FOREIGN PATENT DOCUMENTS

| | | |
|---|---|---|
| CN | 105279746 A | 1/2016 |
| CN | 105453134 A | 3/2016 |
| CN | 106157305 A | 11/2016 |
| CN | 107045715 A | 8/2017 |

\* cited by examiner

METHOD AND APPARATUS FOR COMBINING LOW-DYNAMIC RANGE IMAGES TO A SINGLE IMAGE

CROSS-REFERENCE TO RELATED APPLICATION

This application is a bypass continuation application of PCT application no.: PCT/CN2019/082328. This application claims priority from PCT Application No. PCT/CN2019/082328, filed Apr. 11, 2019, the contents of which is incorporated herein in the entirety by reference.

FIELD OF TECHNOLOGY

The present invention relates to the field of image processing, more particularly, to a software library, which combines a few images of the same scene, captured with different brightness, to achieve a single image representing higher dynamic range of scene brightness.

BACKGROUND

Contemporary image sensors suffer from insufficient dynamic range. They cannot capture both dark and bright areas in a typical outdoor scene (e.g. shade and sky) with reasonable signal-to-noise ratio. Usually, dark areas have too low pixel values, comparable to noise level, and/or brightest regions get clipped to the sensor saturation level. To overcome this obstacle, few images with different exposure times and/or sensor sensitivities (gain) can be captured. The dark images (short exposure times) capture well the bright areas like sky, but contain no useful information in the dark areas. The bright images capture well the dark areas (shades), but the bright areas get overexposed and saturated. Then, an algorithm is necessary, which to combine (stitch, fuse) the dark and bright images, taking the useful information from each one and producing a single high-dynamic range image (HDR).

Many articles describe HDR fusion algorithms. The fusion can be achieved by different methods, which can be classified into two main approaches:

(1) Fusion in the Radiance Domain.

The fused image pixel values are proportional to scene luminance. Such methods are applicable in practice only on unprocessed images, coming out from the image sensor. Contemporary cameras apply sophisticated processing on the sensor images, after which, it is very hard or impossible to recover the overall camera response function.

Such methods require post-processing by sophisticated adaptive local and global tone mapping algorithms, which to shrink range of the pixel values in the fused HDR image down to displayable range.

(2) Fusion in the Image Domain.

A milestone of that approach is the article "Exposure Fusion" of Mertens at al. Different regions from differently exposed images, having different camera response curves are seamed directly. To avoid the brightness transitions between areas, taken from different images, a Laplacian pyramid is used for fusion. This approach incorporates implicitly local and global tone mapping, so the fused image has pixels dynamic range similar to the input images, hence no sophisticated post processing is needed to shrink it to displayable levels.

Regardless of what approach will be used for fusion, the major problem in HDR fusion are the moving camera and moving objects while the multiple images are being captured. If the fusion algorithm does not take this into account, ghost-like artefacts appear in the final image. Many approaches exist for detecting the potential ghost regions. Most of them rely on the assumption that static parts of the scene are similar in the radiance domain between the differently exposed images. The result of ghost detection may be a strong mask of similarity and non-similarity areas or per-image per-pixel weights showing the probability each pixel to contain static scene.

Non-similarities due to camera motion are mostly eliminated by using frames registration algorithms to align the input frames. However, many other non-similarities remain in practical scenes—they are caused by moving objects, motion blur, imperfection in the frames' alignment, differences caused by different image processing parameters applied on the input differently exposed input images, translational movement of the camera, causing mutual objects movement within the image, which cannot be represented and compensated by global frame alignment. Once detected, two major approaches are used to avoid the ghosts:

(1) Take the Motion Areas from a Single Image

This approach relies on the fact that the scene is self-consistent in each single image. The simplest way is to take all non-similarities from a reference image. This method leaves many motion areas either overexposed or too dark or noisy if they are badly exposed in the reference image. A better approach is to take each non-similarity region from one image or one set of images, being similar within that region.

(2) Global Optimization to Adjust the Per-Pixel Contribution Weights

The fusion of a few images can be expressed as a weighted average of their pixels, either fusing the pixel values or transformations of the images (like Laplacian pyramids or gradient maps). Each pixel in each image has its own weight. Ideally, in the static areas, the pixels with best exposures should have maximum weights. In motion areas (non-similarities), only the pixels from images containing the background and are well exposed should have high weights. The most sophisticated approaches of ghost detection and removal try to define a global objective function, which incorporates ghost detection information and depends on the weights. The weights are determined by minimizing this objective function. This is extremely computationally expensive process, which is not applicable for a mobile device, where the computational power is limited and the processing time is also limited by the user expectations.

A different approach for HDR fusion and ghosts handling is adopted by Hasinoff at all. in "Burst photography for high dynamic range and low-light imaging on mobile cameras". Instead of capturing differently exposed images, they capture multiple dark images to minimize the overexposed areas and apply sophisticated multi-frame denoising to decrease the noise in dark areas and hence increase the dynamic range. After the denoising, the dark areas are lightened by multiplying the pixel values, which again increases the noise in dark. The moving objects are handled by constructing a motion field. A large number of dark images is necessary to achieve good signal-to-noise ration in dark areas—they limit it to 8, probably for performance reasons. Although they achieve very good overall results, the dark areas look noisy and their method is limited to Bayer image domain, where the information in darkest parts of the scene is not affected by image processing and quantization. This makes this algorithm not applicable as a post-processing step.

In general, all methods, trying to produce the fused image by per-pixel weighted average of a few images assume that many input images are present and each pixel is well-exposed in more that one input image. In practice, as few as possible differently exposed images should be captured, in order to minimize the processing time. Also, the initial image alignment is never perfect. Even sub-pixel misalignment of the objects edges in the images causes visible deterioration of the sharpness after averaging. The alignment itself deteriorates the sharpness to some extent due to using bilinear pixel interpolation, which is the only option in contemporary mobile GPUs, used due to their speed for frames warping. To preserve sharpness of the input images as much as possible and to minimize the required number of input images, each pixel in the fused image should be taken from one input image.

Another problem, related to the ghosting are the non-recoverable areas. Those are areas in the scene, usually occlusions caused by moving objects, which are badly exposed in all the images. For example, if a dark object is moving in front of bright background, it has to be taken from some bright image, at the place it is there. The bright background should be taken from a dark image, however, part of it is occluded by the dark object, being in different place in the dark image. This problem is little or not discussed in the articles so far.

SUMMARY

In order to address such a technical problem in the prior art, one aspect of the invention provides a method for combing low-dynamic range images to a single image, the method comprising:
    acquiring low-dynamic range images with different EV compensation values;
    detecting areas of non-similarity of the images by equalizing image brightness according to mutual 2D histograms;
    modifying the images in the non-similarity areas before a Laplacian decomposition to the images;
    re-distributing and adapting different fusing weights to the images to fuse a single height dynamic range image.

According to an embodiment of the invention, the images exposure and sensitivity settings are captured in a certain sequence: dark-normal-bright-normal-dark-normal-bright or bright-normal-dark-normal-bright-normal-dark.

According to an embodiment of the invention, the images are aligned to one of them by equalizing different exposure brightnesses through mutual gammas, calculated from the images histograms and tracking features within the equalized images.

According to an embodiment of the invention, the non-similarity areas in the images are found after equalizing the aligned images brightness by mutual gammas, derived from mutual 2D histograms.

According to an embodiment of the invention, each non-similarity area is taken from its reference image, converted to the other two exposures, using the mutual gammas, and is copied in some or all of the images of the corresponding exposures.

According to an embodiment of the invention, wherein the fusion weights within the non-similarity areas are redistributed among a new local reference image for each area and areas, similar to it, among its neighboring images of different exposures.

According to an embodiment of the invention, wherein the weights are adapted after decomposition in a Gaussian pyramid to adjust the global tone mapping and local contrast enhancement.

According to an embodiment of the invention, the method further comprising:
    executing frames alignment to the images while the frames are being captured during a burst capture.

According to an embodiment of the invention, the executing frames alignment further comprising:
    equalizing brightness of the images via corresponding mutual gamma correction;
    detecting features to track in a reference image and tracking the features in each of the other images;
    executing homography transforms to warp each image from the other images to match the reference image.

According to an embodiment of the invention, the method further comprising:
    capturing seven input low resolution images of three exposure and sensitivity settings;
    converting a 3rd and 5th images via a mutual gammas to pixel brightness values of a 4th reference image;
    combining two difference masks by "OR" logical operation, grouping adjacent non-similar pixels together using connected component labeling to form distinct areas;
    analyzing the pixel values in each area to determine which exposure should be used to take each area from.

According to an embodiment of the invention, the method further comprising:
    replacing the non-similarity areas with brightness-adjusted information from other images, prior to pyramid decomposition.

Another aspect of the invention provides an apparatus for combing low-dynamic range images to a single image, comprising:
    an acquisition module used to acquire low-dynamic range images with different EV compensation values;
    a detection module used to detect areas of non-similarity of the images by equalizing image brightness according to mutual 2D histograms;
    a modification module used to modify the images in the non-similarity areas before a Laplacian decomposition to the images;
    a fusing module used to re-distribute and adapt different fusing weights to the images to fuse a single height dynamic range image.

Another aspect of the invention provides an electronic device, comprising:
    a processor; and
    a memory for storing instructions executable by the processor,
    wherein the processor is configured to execute a method according to any one of embodiments disclosed above in the first aspect.

Another aspect of the invention provides a non-transitory computer-readable storage medium storing executable instructions that, when executed by an electronic device with a touch-sensitive display, cause the electronic device to execute a method according to any one of embodiments disclosed above in the first aspect.

DETAILED DESCRIPTION

The invention will now be described in greater detail with reference to the figures.

Figure 1:
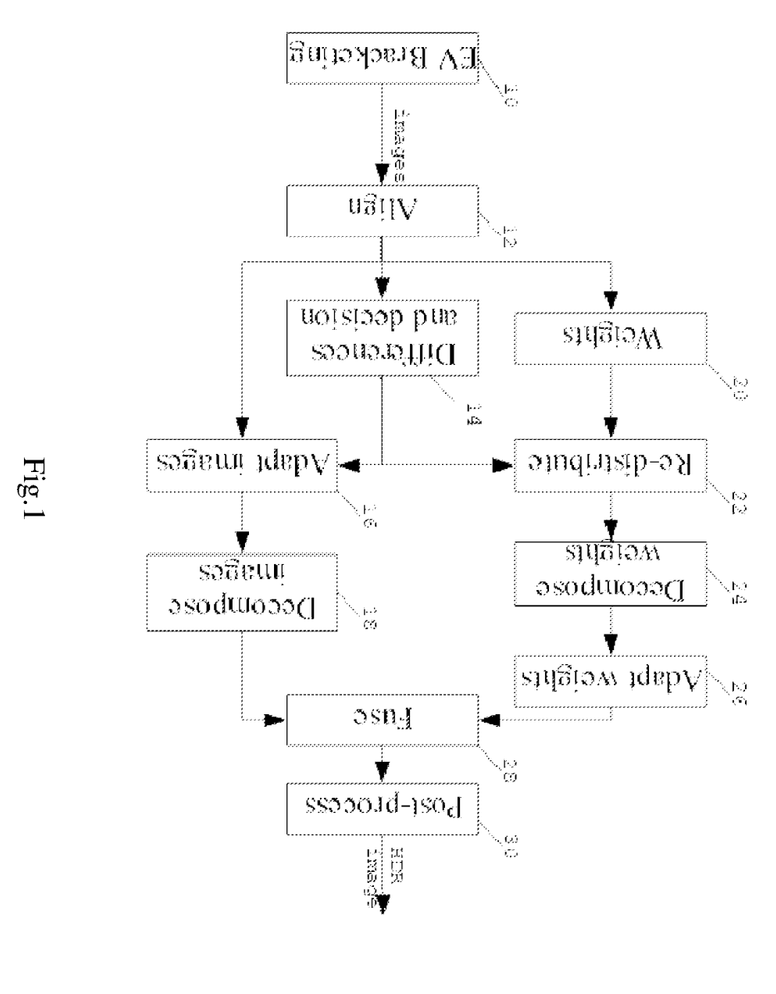
FIG. 1 shows the dataflow and major functional block of the overall HDR stitching algorithm.

With respect to FIG. 1, the general stages of a high dynamic range (HDR) stitching according to the invention are described.

The first stage is capturing the images (stage #10) using EV bracketing feature, present in most contemporary mobile cameras. This stage is missing in case the HDR stitching algorithm is running on a non-camera device (like computer) and the differently exposed images are captured by an external device and provided to it. In case the stitching algorithm is running on a camera device, it requests from the camera to capture 7 images with different EV compensation values as fast as the camera can. The EV compensation values determine how brighter (positive values) or darker (negative) an image should be with respect to an image, captured by the camera without EV compensation. The embedded camera auto-exposure control algorithm determines the actual exposure time and sensor sensitivity. EV value 1 means 2 times longer total exposure; −1 mean 2 times shorter. Total exposure is the exposure time, multiplied by the sensor sensitivity. In practice, minimum 3 images need to be captured with EV compensation values −2.0 and +2, meaning total exposures 4 times shorter and longer than "auto" image with EV=0. The values +2 and −2 are exemplary values. If the camera has good image processing, with good noise reduction, +3/−3 values can be used to increase the output dynamic range further. EV compensation of +/−2 is enough for most of the scenes, captured for entertainment.

The image with EV0 is used as a reference image—it contains most of the scene well exposed and those areas will be passed from it to the final HDR image with as less as possible change. Only the too dark and the overexposed areas in the reference image will be taken from the brighter (EV+2) and the dark (EV−2) images respectively. This approach guarantees the HDR image will look similar to the no-HDR capture (EV0), but it will be improved in dark and bright areas. This is important requirement in practice, where significant change of the average HDR image brightness with respect to the non-HDR image, on a certain scene, may be considered "improvement" by some users and "deterioration" by others.

Using just 3 images imposes frequent existence of non-recoverable areas (see the end of the BACKGROUND section). To avoid this problem, we capture the input images in a certain sequence. Seven input low resolution images are of three exposure and sensitivity settings are captured, where the middle 3 images ($3^{rd}$, $4^{th}$, $5^{th}$) are from all 3 different settings, the $1^{st}$ and $2^{nd}$ images have the same settings as the $4^{th}$ and $5^{th}$ images and the $6^{th}$ and $7^{th}$ images have the same settings as $3^{rd}$ and $4^{th}$. An example such sequence, given as EV compensation values, is: −2,0,+2,0,−2,0,+2. The groups of images with same setting are often referred below as just "exposure", e.g. short exposure, means any of the two images captured with EV-2.

The $4^{th}$ image (EV0) is the reference one. If the scene is purely static, only the $3^{rd}$ and $5^{th}$ images will be used to improve the reference image. In most cases, however some objects are moving within the scene, creating non-similar and potentially non-recoverable areas. The images have to be captured quickly one after another, using EV bracketing—it can reach 30 frames-per second for a few images with the contemporary 8-12MPix image sensors. During the time for capturing, the objects move usually linearly or at least along some simple curve without turn-arounds. Having two dark images, surrounding the reference image guarantees any non-recoverable (well-exposed, but occluded) area in either of them will not be occluded in the other. Similar for the bright images couple.

Each of the $3^{rd}$-$5^{th}$ image may appear a "reference" for some area (see below). Some of the pixels in this area may need to be taken from other exposures. The order above guarantees that each of the middle 3 images have two images of all the other exposures surrounding it, hence the chance of non-recoverable areas is minimized.

Figure 2:
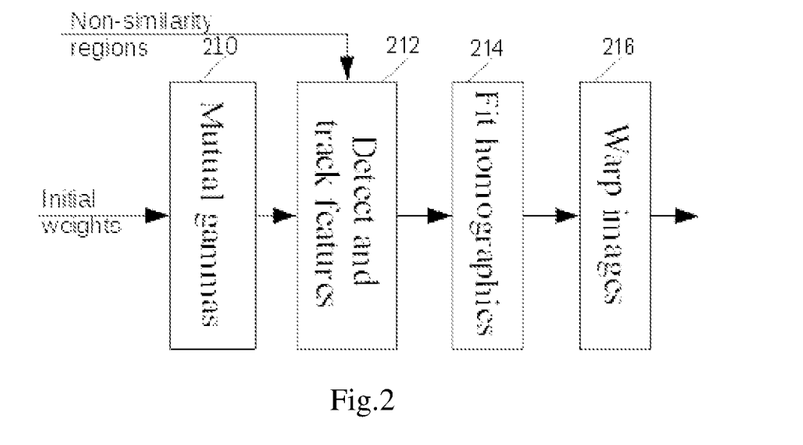
FIG. 2 shows the sub-stages of first processing stage: aligning of the images (#12 in FIG. 1.) to one of them.

The captured image are fed to the next stage 12 "align frames", which is shown in more details in FIG. 2. Referring to FIG. 2, the first substage is 210 "mutual gammas". Since the images from the three exposures have different brightness, two mutual response functions are determined based on the middle three images' histograms. Those are look-up tables (LUTs), used to transform the pixels values of shorter exposure to pixel values of the longer exposure between neighboring exposures. Each point in the LUT has index and value, representing pixels values in the two dark-bright image couple. Two corresponding pixels values (dark, bright) correspond to same bins in the cumulative histograms. The LUT values for the missing pixels values, if any, are interpolated from the neighboring, existing pixels values.

Next substage is 212 "Detect and track features". Good features to track are detected in the reference image and are tracked in each of the other mages, after equalizing their brightness via the corresponding mutual gamma. The result is a set of corresponding pixel coordinates, seeing same object, between each image and the reference. The tracking is using 3-starge pyramid of resolutions for faster performance. Then (214, "Fit homographies") homography transforms are found, describing how to warp each image to match the reference one. A few iterations are looped to detect and remove potential errors during tracking and features detected on moving objects—outliers. The homography is determined by features on the background static scene and are presented as mesh grids for each of the images, except for the reference one. Each grid's vertices contain horizontal and vertical pixel coordinates in one of the images, corresponding to a regular grid of vertices, covering the reference image, i.e. those are backward mapping grids. Then the frames are warped using GPU for fastest performance and minimum power consumption—216, "warp images". The Frames alignment is executed while the frames are being captured during the burst capture, thus minimizing the button-to-ready time of the whole HDR capture process.

Figure 3:
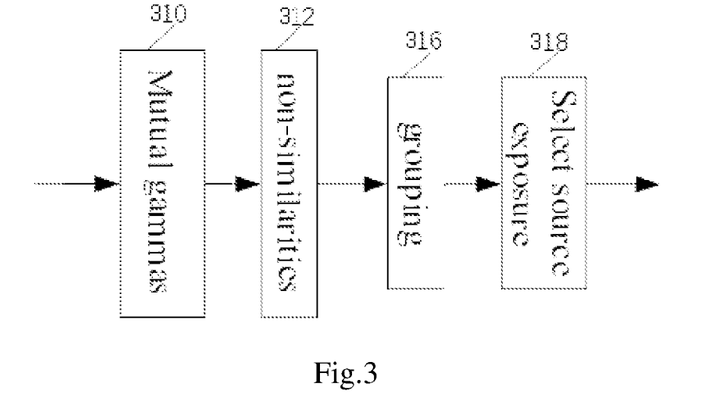
FIG. 3 shows the sub-stages of the "differences and decision"

Next stage in FIG. 1. is 14 "Differences and decision", expanded to more details in FIG. 3. Referring to FIG. 3., first substage is again building "mutual gammas". This time, those are calculated on aligned images, using 2D mutual histograms. The two axes (X,Y) of a mutual histogram represent bins of pixel values in each of the two images. Each point or cell in the mutual histogram is a 2D bin, representing a range (bin) of pixels values in both images. Each 2D bin contains a number—the number of pixels being on same position in both images and having pixel values within the corresponding 1D bins. The 2D histogram may be considered as a surface—histogram values are heights of each 2D bin above the XY plane. The surface contains a central ridge, which XY coordinates define the mutual gamma curve. The 2D bins lying close to the ridge correspond to pixels, seeing same scene, but affected by noise. The 2D bins lying far outside the ridge correspond to pixels, which see different scenes in the two images—moving objects.

The next step in FIG. 3. is finding non-similarities—312. First the $3^{rd}$ and $5^{th}$ images (dark and bright) are converted via the mutual gammas to pixel brightness values of the reference image ($4^{th}$—a normal image). In each couple (3,4 and 5,4), the same-positioned pixels, which differ by more than a threshold in the RGB space are marked as non-similar pixels in a binary image called "difference mask"—they are from moving objects.

Next stage is 316 "grouping". The two difference masks (3,4 and 5,4) are combined by "OR" logical operation. Adjacent non-similar pixels are grouped together using connected component labelling to form distinct areas. Too small areas are discarded. Then in 318 "select source exposure", the pixel values in each area are analyzed and a decision is taken—which exposure should be used to take each area from. This approach guarantees image consistency (no ghosts) within the non-similarity areas. Note, a non-similarity area encompasses a moving object positions in the three middle images. Taking all the pixels within a difference area from a single image guarantees no ghosting will appear.

The result of the overall block 14 "difference and decision" in FIG. 1. is a set of non-similarity areas masks and from each exposure each one should be taken—i.e. a reference image (3, 4 or 5) for each area. Note, some of the pixels in an area are nor well exposed in its reference image—those pixels will be taken from other exposures, where they appear similar to the area's reference image. So, an area is assigned to a certain (reference) exposure, but not all of its pixels will be taken from this exposure.

The next stage in FIG. 1. is 20 "weights". Ideally, if the scene is static, only the middle 3 images would be fused to a single HDR image. The fusion can be thought of as a weighted averaging of same-positioned pixels of the 3 images. A weight coefficient is assigned to each pixel in each image, forming 3 weight images. The weights are determined according to pixel lightness in the reference image and they do not depend at this stage on the difference maps. Each pixel's lightness is calculated as a weighted average of R,G,B and the maximum among R,G,B values of the pixel. The four weights are a tuned manually. The weights of the reference image are determined through a trapezoid LUT table, defining a weight versus pixel lightness. For middle pixel lightnesses, the reference weight is 1, meaning such pixels will be taken only from the reference image. Below some threshold, the reference weights decrease smoothly to 0, and the rest to 1 is assigned to the bright image weights, meaning the darkest pixels will be taken only the brighter image and there is some transition area along pixel lightnesses, where the pixels will be averaged from the normal and the brighter images. Similarly, the reference weights above some threshold decrease, transferring weights to the darker image. So far, only the middle 3 images have weights different from 0. If fusing the middle 3 images with their weights, as calculated so far, and if some moving objects have lightnesses within the transitional areas of the trapezoid weight LUT, there will be ghosts in the fused image.

The next stage (22, "re-distribute") transfers weights within the non-similarity areas form each area's reference image to the neighboring images of different exposures. Assume a non-similarity area is decided to be taken from a dark image ($5^{th}$ image, EV-2) because most of it contains an overexposed moving object in the reference image. This area is comprised of the moving object and the background, which is occluded at the object position in the reference image:

The occluded area is part of the background and is too dark to be taken from the dark image. However, it is occluded in the reference image, so it should not be taken from there also. In this case, the occluded area should be taken from the $6^{th}$ image, which is same exposure as the reference one (EV0), but captured after it. Since the object moves to the right, this area contains a well exposed background in the $6^{th}$ image and can be taken from it. More generally, within each non-similarity area, the well exposed pixels in its local reference image are assigned to that image (high weights for that image). The badly exposed pixels are assigned to the neighboring images with other exposures, where those pixels are similar to the ones in the local reference image. To calculate the similarity between differently exposed pixels, the mutual gammas from stage 14 are used. As a result, the weights in the non-similarity areas, which are distributed only among the middle 3 images after stage 20, are now redistributed among a new local reference image for each area and areas, similar to it, among its four neighboring images.

Figure 4:
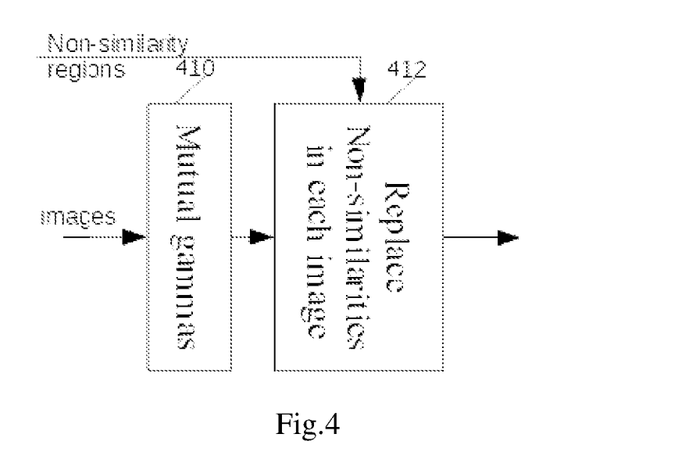
FIG. 4 shows sub-stages of the "Adapt images"

Re-distributing the weights is not enough to avoid the ghosting. The fusion is done using a Laplacian pyramid. While decomposing each image into a pyramid, the information from the occluded areas (within which, the weights were re-assigned) propagates in the well-assigned areas also. Hence, part of the information, which should be excluded in the fused HDR image, actually appears there. In order to avoid that, in the stage 16 "adapt images", each non-similarity area is taken from its reference image, converted to the other two exposures, using the mutual gammas from 14, and replaced in all the images of the corresponding exposures.

The adapted images are then decomposed to Laplacian pyramids in stage 18 "decompose images". The corresponding weights are decomposed to Gaussian pyramids in stage 24 "decompose weights".

Stage 26 "adapt weights" regulates the ratio between local and global tone-mapping. In general, there are two ways to compress the pixel values range of an HDR image to displayable, low-dynamic range—local and global tone mapping (or local/global brightness and contrast enhancement). Global tone mapping means roughly to convert all the pixels through a look-up table (gamma)—one and the same for all the pixels. This approach preserves the order of pixel lightnesses among the whole image, but it decreases the contrast within the bright areas. Local time mapping means to brighten the dark areas and darken the bright areas, while preserving the contrast within them, while decreasing the differences between the whole areas. This approach produces good contrast of the images, but often—unnatural look.

Fusing differently exposed images with weights according to pixel lightnesses by a Laplacian pyramid has the effect of local tone mapping. If fixed weights are used (a single number per image), fusing either directly or by a Laplacian pyramid is equivalent to global tone mapping. The values of the weights and the input images response curves determine the final response curve. In order to regulate the amount of local contrast enhancement over the global tone mapping, the weights in the coarsest level of the pyramid are pulled towards same value like:

$$new\_weight = weight*(1-k) + fixed\_value*k$$

The "fixed_value" and "k" ate tuned manually to match the desired contrast. When "k" equals 1 all the weights become equal and the fused image is globally tone-mapped. While "k" decreases to 0, the fused image gets more and more detailed and contrast.

Next stage 28 "Fuse" averages the corresponding pixels among all the image Laplacian pyramids according to the weights in the Gaussian pyramids. The result is a single Laplacian pyramid. During the weighted averaging, the middle layers of the resulting Laplacian pyramid are scaled by some manually tuned multipliers, which has the effect of additional edge enhancement and additional local contrast enhancement. Also, the finest layers of the resulting Laplacian pyramid, having small absolute values are pulled further toward 0. This has the effect of denoising. The scales and thresholds of those operations are tunable according to the desired look of the output images. Then, the resulting Laplacian pyramid is composed to an image.

The last stage 30 "post-processing" corrects some problems, native to fusion using Laplacian pyramids. Depending on the scene, after fusion and composing the pyramid onto an image, the pixel values in the darkest areas may differ from the ones on the bright input images. The brightest areas, taken from dark images, also could differ from their original values. Finally, the middle tones, taken form the reference image could differ from the original. The black levels of the fused image and the dark image (among the 3 middle images) are measured as the pixel value, below which a certain percentage of all the pixels reside. The white level of the fused image is also measured as a pixel value, above which a certain percentage resides. The average brightnesses of the fused and the reference images a also measured. The measured values determine a global tone-mapping curve, which is applied on the fused image and drives the dark level to the one of the bright exposure, pulls the white level to near-saturation and increases the average brightness if necessary to the reference level, thus preventing the fused image to look darker than the reference one. Those adjustments aim to avoid getting a fused image, which has too different brightness distribution then the reference image. In a typical camera device, the user can capture one and the same scene with HDR stitching and without it (resulting ne the reference image). The user expects the HDR image to be similar, but better than the reference one. Being too different may be considered and "worse" or at least as "unexpected" behavior of the HDR stitching.

The typical embodiment of this invention as an additional feature over a regular mobile camera device was described above. Other embodiments may pose different requirements the HDR fusion algorithm and/or tuning. They can be achieved by modifying certain processing stages. For example, if the requirement to look similar to the reference image is relaxed, the final post-processing (30) can be modified to build the gamma in more sophisticated way. In another embodiment, using only two exposures may be beneficial—for example due to performance reasons, to decrease the number of captured and processed images. Also, if an image sensor with large pixels and hence good signal-to-noise ration is the dark areas is used, only the bright and overexposed areas may be enhanced by the algorithm in this invention, requiring only normal and dark exposures. The same algorithm could be used, just removing the parts dealing with the $3^{rd}$ exposure and tuning the weight LUT and the other tuning parameters accordingly.

In another embodiment, further different from the typical one, an output HDR image with linear pixel response to light and linear input images may be required, for example for a machine vision consumer. Again, the same algorithm may be used, simplified by removing the mutual gammas (replacing them by simple multipliers) and removing the gamma curve in the post-processing stage (leaving only black and white levels adjustment).

Figure 5:
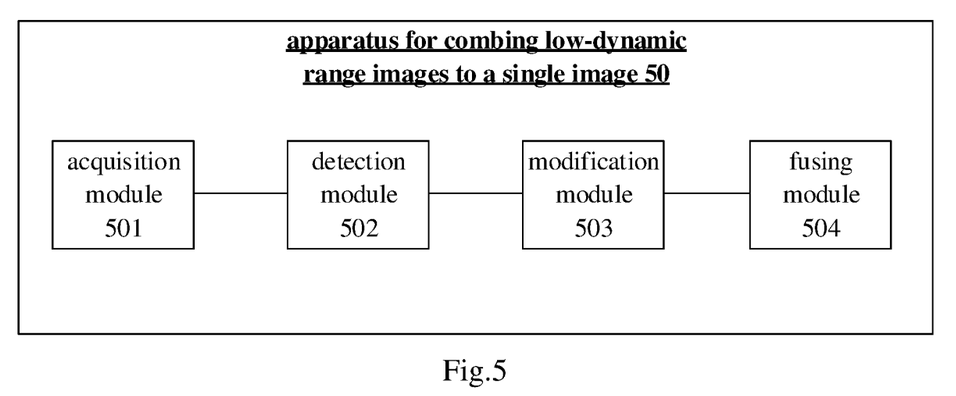
FIG. 5 is a block diagram of an apparatus for combing low-dynamic range images to a single image in accordance with an exemplary embodiment of the present disclosure.

As shown in FIG. 5, an apparatus for combing low-dynamic range images to a single image 50 comprising an acquisition module 501 used to acquire low-dynamic range images with different EV compensation values, a detection module 502 used to detect areas of non-similarity of the images by equalizing image brightness according to mutual 2D histograms, a modification module 503 used to modify the images in the non-similarity areas before a Laplacian decomposition to the images, a fusing module 504 used to re-distribute and adapt different fusing weights to the images to fuse a single height dynamic range image.

Figure 6:
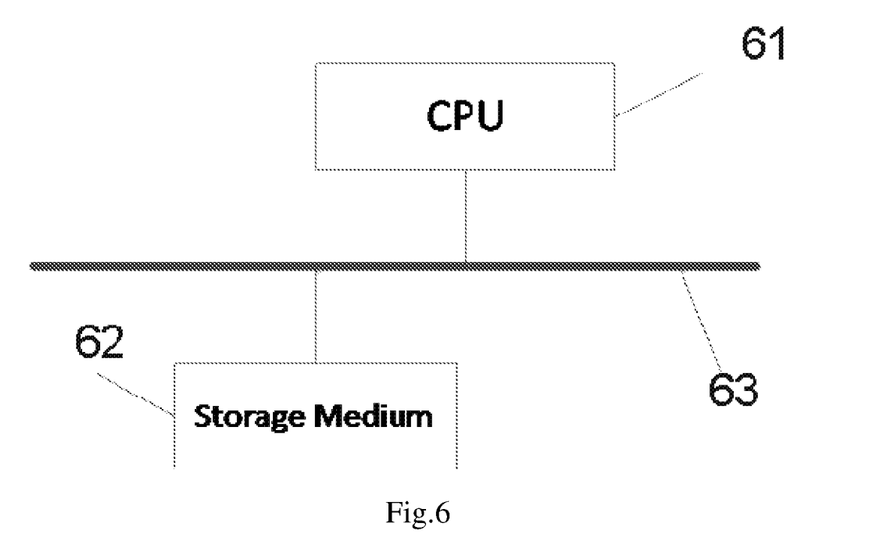
FIG. 6 provides an example of an apparatus according to one or more embodiments of the present disclosure.

FIG. 6 provides an example of an apparatus according to one or more embodiments of the present disclosure. As shown in FIG. 6, the apparatus includes a central processing unit (CPU) 61, a storage medium 62, and a bus 63 that connects the CPU 61 and the storage medium 62. The storage medium 62 may store the computer executable instructions. When the computer executable instructions are executed by the CPU 61, the apparatus may perform the methods disclosed in this disclosure.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

Those skilled in the art should understand that any of the above embodiments is just an example, and does not mean that the present disclosure (including claims) are limited to these examples. According to the present disclosure, the above embodiments or technical features of different embodiments can be combined, steps can be arranged in any order. There are many other variations of the above described different aspects of the present disclosure, and for simplicity these variations are not specifically described.

For simplicity of illustration and discussion, and for easy understanding of the present disclosure, the accompanying drawings may show or may not show known couple of a power source/ground of an integrated circuit (IC) and other parts. Additionally, the apparatus can be shown in a block diagram to avoid difficult understanding of the present disclosure, and the following are considered, that is, the detailed features of the embodiments of the apparatus shown in the block diagram greatly depends on the platform of implementing the present disclosure (that is, the detailed features can be fully understood by those skilled in the art). Under the condition of that the detailed features (for example, a circuit) are illustrated to describe the exemplary embodiments of the present disclosure, for those skilled in the art it is apparent that the present disclosure can be implemented without the detailed features or under the condition of that variations can be made to the detailed features. Therefore, these descriptions should be understood to be illustrative and not limitative.

Although the present disclosure is illustrated in combination with the detailed embodiments of the present disclosure, according to the above descriptions, for those skilled in the art, various substitutes, modifications, and variations of these embodiments are obvious. For example, other storage structures (for example, dynamical RAM (DRAM)) can employ the discussed embodiments.

The embodiments of the present disclosure mean to cover all of these substitutes, modifications, and variations which fall within the scope of the appended claims. Therefore, within the spirit and principle of the present disclosure, any omission, modification, equivalent substitute, and modification should fall within the protection scope of the present disclosure.

The invention claimed is:

1. A method for combing low-dynamic range images to a single image, the method comprising:
    acquiring low-dynamic range images with different EV compensation values;
    detecting areas of non-similarity of the images by equalizing image brightness according to mutual 2D histograms;
    modifying the images in the non-similarity areas before a Laplacian decomposition to the images;
    re-distributing and adapting different fusing weights to the images to fuse a single height dynamic range image.

2. The combing method according to claim 1, wherein the images exposure and sensitivity settings are captured in a certain sequence: dark-normal-bright-normal-dark-normal-bright or bright-normal-dark-normal-bright-normal-dark.

3. The combing method according to claim 1, wherein the images are aligned to one of them by equalizing different exposure brightnesses through mutual gammas, calculated from the images histograms and tracking features within the equalized images.

4. The combing method according to claim 3, wherein the non-similarity areas in the images are found after equalizing the aligned images brightness by mutual gammas, derived from mutual 2D histograms.

5. The combing method according to claim 4, wherein each non-similarity area is taken from its reference image, converted to the other two exposures, using the mutual gammas, and is copied in some or all of the images of the corresponding exposures.

6. The combing method according to claim 1, wherein the fusion weights within the non-similarity areas are redistributed among a new local reference image for each area and areas, similar to it, among its neighboring images of different exposures.

7. The combing method according to claim 6, wherein the weights are adapted after decomposition in a Gaussian pyramid to adjust the global tone mapping and local contrast enhancement.

8. The combing method according to claim 1, wherein the method further comprising: executing frames alignment to the images while the frames are being captured during a burst capture.

9. The combing method according to claim 8, wherein the executing frames alignment further comprising:
    equalizing brightness of the images via corresponding mutual gamma correction;
    detecting features to track in a reference image and tracking the features in each of the other images;
    executing homography transforms to warp each image from the other images to match the reference image.

10. The combing method according to claim 1, wherein the method further comprising:
    capturing seven input low resolution images of three exposure and sensitivity settings;
    converting a $3^{rd}$ and $5^{th}$ images via a mutual gammas to pixel brightness values of a $4^{th}$ reference image;
    combining two difference masks by "OR" logical operation, grouping adjacent non-similar pixels together using connected component labeling to form distinct areas;
    analyzing the pixel values in each area to determine which exposure should be used to take each area from.

11. The combing method according to claim 1, wherein the method further comprising:
    replacing the non-similarity areas with brightness-adjusted information from other images, prior to pyramid decomposition.

12. An apparatus for combing low-dynamic range images to a single image, comprising:
    an acquisition module used to acquire low-dynamic range images with different EV compensation values;
    a detection module used to detect areas of non-similarity of the images by equalizing image brightness according to mutual 2D histograms;
    a modification module used to modify the images in the non-similarity areas before a Laplacian decomposition to the images;
    a fusing module used to re-distribute and adapt different fusing weights to the images to fuse a single height dynamic range image.

13. An electronic device, comprising:
    a processor; and
    a memory for storing instructions executable by the processor,
    wherein the processor is configured to execute the method of claim 1.

14. A non-transitory computer-readable storage medium storing executable instructions that, when executed by an electronic device with a touch-sensitive display, cause the electronic device to execute the method of claim 1.

15. The electronic device of claim 13, wherein the images exposure and sensitivity settings are captured in a certain sequence: dark-normal-bright-normal-dark-normal-bright or bright-normal-dark-normal-bright-normal-dark.

16. The electronic device of claim 13, wherein the images are aligned to one of them by equalizing different exposure brightnesses through mutual gammas, calculated from the images histograms and tracking features within the equalized images.

17. The electronic device of claim 16, wherein the non-similarity areas in the images are found after equalizing the aligned images brightness by mutual gammas, derived from mutual 2D histograms.

18. The electronic device of claim 17, wherein each non-similarity area is taken from its reference image, converted to the other two exposures, using the mutual gammas, and is copied in some or all of the images of the corresponding exposures.

19. The electronic device of claim 13, wherein the fusion weights within the non-similarity areas are redistributed among a new local reference image for each area and areas, similar to it, among its neighboring images of different exposures.

20. The electronic device of claim 19, wherein the weights are adapted after decomposition in a Gaussian pyramid to adjust the global tone mapping and local contrast enhancement.

\* \* \* \* \*